(12) United States Patent
Renz et al.

(10) Patent No.: US 12,512,526 B2
(45) Date of Patent: Dec. 30, 2025

(54) ARRANGEMENT FOR TEMPERATURE MEASUREMENT ON A BATTERY CELL, AND BATTERY CELL HAVING SUCH AN ARRANGEMENT

(71) Applicant: Dr. Ing. h.c. F. Porsche Aktiengesellschaft, Stuttgart (DE)

(72) Inventors: Fadi Renz, Kornwestheim (DE); Philipp Strobl, Weil der Stadt (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 727 days.

(21) Appl. No.: 17/855,877

(22) Filed: Jul. 1, 2022

(65) Prior Publication Data

US 2023/0006272 A1     Jan. 5, 2023

(30) Foreign Application Priority Data

Jul. 5, 2021   (DE) .......................... 102021117224.1

(51) Int. Cl.
*H01M 10/48*   (2006.01)
*H01M 10/643*   (2014.01)
*H01M 10/653*   (2014.01)
*H01M 50/204*   (2021.01)

(52) U.S. Cl.
CPC ....... *H01M 10/486* (2013.01); *H01M 10/482* (2013.01); *H01M 10/643* (2015.04); *H01M 10/653* (2015.04); *H01M 50/204* (2021.01)

(58) Field of Classification Search
CPC ............. H01M 10/486; H01M 10/643; H01M 10/653; H01M 50/204; H01M 10/482
See application file for complete search history.

(56) References Cited

U.S. PATENT DOCUMENTS

| | | |
|---|---|---|
| 7,097,934 B2 | 8/2006 | Shigeta et al. |
| 2011/0177376 A1 | 7/2011 | Maguire |
| 2013/0196180 A1 | 8/2013 | Kim et al. |
| 2013/0224564 A1* | 8/2013 | Kim .................. H01M 50/209 429/158 |
| 2014/0161151 A1 | 6/2014 | Proctor et al. |
| 2015/0303535 A1* | 10/2015 | White ................. H01M 10/635 156/60 |
| 2017/0328784 A1 | 11/2017 | Blundell et al. |

(Continued)

FOREIGN PATENT DOCUMENTS

| | | |
|---|---|---|
| CN | 111442853 A | 7/2020 |
| DE | 4312572 A1 | 10/1994 |

(Continued)

*Primary Examiner* — Olatunji A Godo
(74) *Attorney, Agent, or Firm* — Buchanan Ingersoll & Rooney PC

(57) ABSTRACT

An arrangement for temperature measurement on a solid body includes an annularly closed elastic band, along the circumference of which at least two temperature sensors are arranged at a distance from one another, preferably in a manner distributed uniformly along the circumference of the annularly closed elastic band. The annularly closed elastic band preferably incudes an electrically non-conductive, thermally conductive and/or heat-resistant material. The arrangement for temperature measurement can further be arranged in a groove which runs around the solid body. The solid body may be, for example, a battery cell.

16 Claims, 5 Drawing Sheets

(56) References Cited

U.S. PATENT DOCUMENTS

2020/0319035 A1    10/2020   Keenan
2023/0205170 A1*    6/2023   Sanchez ................ B29C 64/393
                                                               700/98

FOREIGN PATENT DOCUMENTS

| DE | 60305221 T2 | 3/2007 |
| DE | 102019124604 A1 | 3/2021 |
| DE | 102019124605 A1 | 3/2021 |
| WO | 2010066556 A1 | 6/2010 |

* cited by examiner

ARRANGEMENT FOR TEMPERATURE MEASUREMENT ON A BATTERY CELL, AND BATTERY CELL HAVING SUCH AN ARRANGEMENT

CROSS-REFERENCE TO RELATED APPLICATION

This application claims priority to German Patent Application No. 102021117224.1, filed Jul. 5, 2021, the content of such application being incorporated by reference herein in its entirety.

FIELD OF THE INVENTION

The present invention relates to an arrangement for temperature measurement on a solid body, in particular an accumulator or battery cell, and to an accumulator or battery cell provided with the arrangement according to aspects of the invention.

BACKGROUND OF THE INVENTION

Measuring and monitoring temperatures is a problem that is often faced in many fields of technology. In addition to the temperatures already measured and monitored at many points on vehicles to date, measuring and monitoring the temperature of the battery provided for supplying power to the drive motor is of great importance in the rapidly growing field of electromobility in particular. In the text which follows, the terms battery and accumulator as well as the terms or expressions comprising these terms will be used synonymously, provided that a respectively particular meaning is not apparent from the context.

The battery provided for supplying power to the drive motor firstly has to store a large amount of energy in order to allow a large range and secondly it has to be able to output high powers in order to meet the power requirement of the motor. In addition, said battery has to be able to be charged with a sufficiently high power in order to allow prompt re-use after discharging.

During discharging and during charging, correspondingly high currents occur, which can lead to a not inconsiderable increase in temperature at the unavoidable inner resistors or during the chemical reaction on which the charging and discharging are based. This increase in temperature can firstly have a strong influence on the charging or discharging characteristics and also the service life of the battery and secondly an excessively sharp rise in temperature can lead to damage to the battery or to components that are thermally coupled to it, resulting in protection devices being tripped or even an uncontrolled exothermic reaction which ultimately renders the use of the battery, and possibly a device supplied by it, impossible.

For this reason, temperature sensors are generally provided in high-power batteries, the temperature sensors detecting an increase in the temperature and passing on this information to a control device. When a limit value is exceeded, the control device reduces the discharging or charging power, before damage to the battery or to components or devices connected to it occurs.

High-power batteries usually comprise a large number of battery cells, which are interconnected in series and/or in parallel, in order to be able to provide a required rated voltage and a required rated current. The battery cells are generally arranged in a housing which provides protection against mechanical damage and can also accommodate sensors and associated electronic circuits. In addition, the housing can be designed to heat and/or to cool the battery in order to set an optimum temperature for charging or discharging the battery. In the text which follows, the housing is also referred to as a battery pack.

Battery cells can be provided, inter alia, in the form of round cells with a rigid cylindrical housing, prismatic cells with a cuboidal rigid housing or what are known as pouch cells, that is to say flat cells without a rigid housing. Cells with their own rigid housing offer advantages in respect of handling when designing and producing battery packs. In addition, the mechanical demands placed on the housing are lower than in the case of pouch cells. Furthermore, a large variety of cells with their own rigid housing are available from a large number of manufacturers, and therefore even relatively small batches of battery packs can be produced in a cost-effective manner.

Particularly when a large number of battery cells are arranged in one housing, the positioning of temperature sensors presents a challenge since good thermal contact between a temperature sensor and the battery cell is of considerable importance for proper functioning.

DE 603 05 221 T2, which is incorporated by reference herein, proposes arranging temperature sensors in a holding structure for a plurality of round cells such that good thermal contact with the respective temperature sensors is provided given proper fitting of the round cells in the holding structure. When standard battery cells with a rigid housing are used, an insulating sheath surrounding the cell may have an adverse effect on the thermal contact between the temperature sensor fitted in the holding structure and the battery cell. Furthermore, replacement of individual temperature sensors, for example in the event of a failure, may be complicated; the entire holding structure may possibly have to be replaced.

SUMMARY OF THE INVENTION

Described herein is an arrangement for temperature measurement on a solid body, in particular a battery cell, which arrangement allows simple fitting of the temperature sensor on the solid body and provides good thermal contact between the temperature sensor and the solid body.

An arrangement according to aspects of the invention for temperature measurement on a solid body, in particular a battery cell, comprises an annularly closed elastic band, along the circumference of which or in the interior of which at least two temperature sensors are arranged at a distance from one another. The elastic band can be placed around the solid body, wherein the circumference of the elastic band is smaller than the circumference of the solid body, so that the elastic band bears against the solid body under elastic stress. As a result, the at least two temperature sensors are also at least indirectly placed against the solid body. In this case, the circumference of the elastic band can be designed for a circumferential region in which firstly sufficient elastic stress to securely hold the arrangement in place is ensured and secondly the tear threshold of the elastic band is not exceeded during assembly. The use of at least two temperature sensors can ensure a redundancy which is advantageous in principle for critical components.

In the context of this description, the expression "annularly closed band" refers to a band which does not have two free ends to be connected to one another. The general shape of the band, that is to say whether it has an oval shape, a circular shape or a shape with one or more corners, is irrelevant here.

In the context of this description, the term "solid body" refers to a body with a rigid outer surface. In this case, the solid body does not have to consist of the same material in solid form but rather can be entirely or partially hollow, and other elements, components, materials etc. can be arranged in any hollow space. In particular, the term "solid body" refers to a battery cell with a rigid housing.

The temperature sensors can comprise thermocouples, PT100 or PT1000 measuring sensors, can be semiconductor-based or can be based on other measurement principles.

In one or more refinements of the arrangement, the annularly closed elastic band consists of an electrically non-conductive, thermally conductive and/or heat-resistant material, for example a silicone or silicone-based material, or the like. The use of an electrically non-conductive material has the readily identifiable advantage that no electric current is conducted by the elastic band to other locations when an electrical line or connection of battery cells is damaged. The advantage of the use of a thermally conductive material is that the accuracy of the positioning of the temperature sensor on or in the elastic band and also on the solid body is less critical. The advantage of the use of a heat-resistant material, in particular with a melting point or flame point far above the temperatures reached during normal operation, is obvious.

In one or more refinements of the arrangement, a surface of each of the at least two temperature sensors terminates substantially flush with an internal surface of the annularly closed elastic band or is at least positioned closer to the internal surface of the annularly closed elastic band than to an external surface.

In one or more refinements of the arrangement, the elastic band has a first elastic layer, and a second layer is arranged at least on a side of the first elastic layer that faces the solid body in the assembled state. The second layer has a greater thermal conductivity than the first elastic layer. A surface of each of the at least two temperature sensors is in thermal contact with the second layer.

In one or more refinements of the arrangement, electrical lines of the at least two temperature sensors are routed to an outer side of the annularly closed elastic band and are routed out or are electrically contactable there.

In one or more refinements of the arrangement, the at least two temperature sensors are arranged in a manner distributed uniformly along the circumference of the annularly closed elastic band. This arrangement of the temperature sensors can allow, in particular on solid bodies with a symmetrical, preferably rotationally symmetrical, cross section, in addition to a certain redundancy, better estimation of the temperature in a region of the solid body between the temperature sensors.

The solid body can comprise, for example, a battery cell, and the arrangement is arranged, for temperature measurement, on the outer surface of the battery cell, for example in a groove or recess which runs around the battery cell. In this case, the arrangement for temperature measurement preferably bears against the outer surface of the battery cell under elastic stress.

In one or more refinements of the solid body, the solid body, for example the battery cell, is surrounded by an electrically non-conductive sheath, for example a shrink sleeve. The electrically non-conductive sheath presses the arrangement for temperature measurement against the battery cell. During production of the solid body, the arrangement for temperature measurement is initially arranged on the solid body, and thereafter the electrically non-conductive sheath is fitted over the solid body and the arrangement for temperature measurement.

A plurality of solid bodies can be arranged together, for example a plurality of battery cells can be arranged in a battery or a battery pack. In this case, at least one of the solid bodies is provided with an arrangement according to aspects of the invention for temperature measurement.

In one or more refinements of the solid bodies which are arranged together, in particular in the case of battery cells which are arranged to form a battery or a battery or battery pack, solid bodies with an arrangement for temperature measurement and solid bodies without such an arrangement for temperature measurement are arranged with respect to one another such that a solid body equipped with the arrangement makes contact with an adjacent solid body without such an arrangement, preferably in the region of one of the temperature sensors. In this way, the temperature of two adjacent solid bodies can be detected using a single temperature sensor, as a result of which the number of temperature sensors can be reduced. It is possible to differentiate between the temperature of the adjacent solid bodies when a solid body without an arrangement for temperature measurement is in contact with solid bodies provided with an arrangement for temperature measurement at two points. For example, a single battery cell which has a higher temperature than the adjacent battery cells can be determined in this way.

BRIEF DESCRIPTION OF THE DRAWING

The invention will be described below with reference to the figures of the drawing. In the drawing.

Identical or similar elements can be referenced with the same reference signs in the figures.

DETAILED DESCRIPTION OF EXEMPLARY EMBODIMENTS

Figure 1:
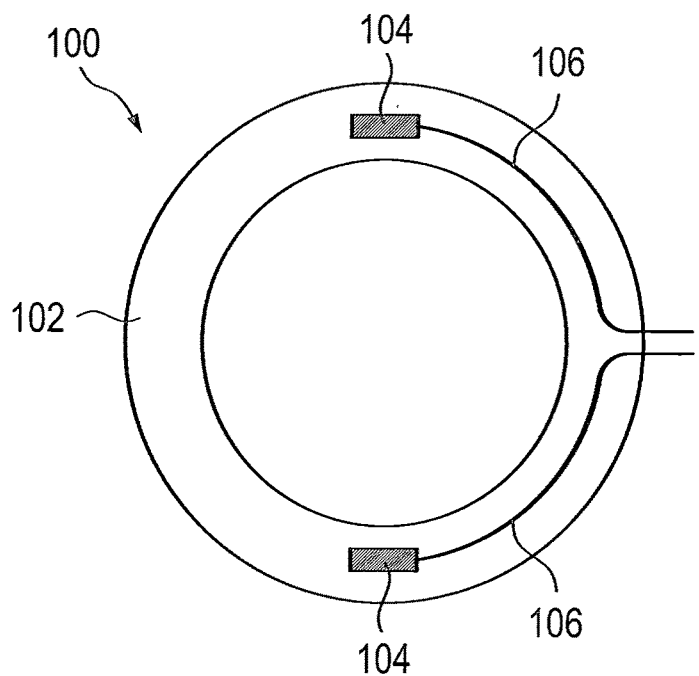
FIG. 1 shows a schematic illustration of a first embodiment of the arrangement according to aspects of the invention for temperature measurement.

FIG. 1 shows a schematic illustration of a first embodiment of the arrangement 100 according to aspects of the invention for temperature measurement. Two temperature sensors 104 are arranged, for example cast or encapsulated by injection molding, in an annularly closed elastic band 102. In the FIG., the temperature sensors 104 are situated diagonally opposite one another, wherein other positioning arrangements are possible, in particular when there are a large number of sensors. The temperature sensors 104 are contactable by means of lines 106 which are routed out of the elastic band 102. The lines 106 can be cast or encapsulated by injection molding into the elastic band 102, wherein the lines can preferably be laid in a wavy line in this case in order to be able to compensate for stretching of the elastic band without tearing. As an alternative to the lines 106, electrical contact areas can also be provided on the outer side of the elastic band 102, it being possible to contact the temperature sensors 104 via said contact areas (not illustrated in the FIG.). The temperature sensors 104 can also be arranged closer to the inner circumference of the elastic band in order to allow better thermal coupling here (not shown in the FIG.).

Figure 2:
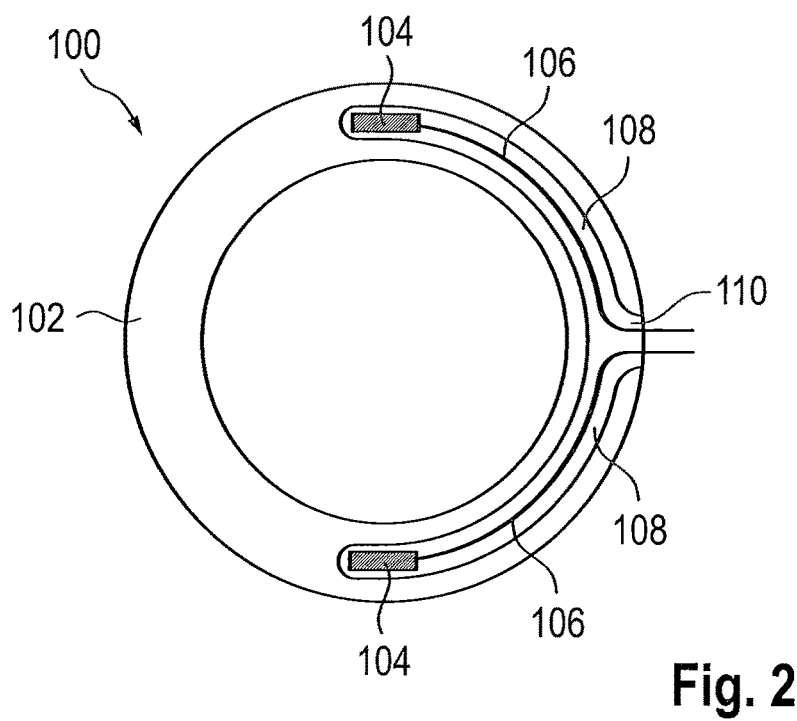
FIG. 2 shows a schematic illustration of a second embodiment of the arrangement according to aspects of the invention for temperature measurement.

FIG. 2 shows a schematic illustration of a second embodiment of the arrangement 100 according to aspects of the invention for temperature measurement. In this embodiment, a hollow space 108 is provided in the elastic band 102, the temperature sensors 104 being mounted or inserted in said hollow space. The lines 106 are routed out of the elastic band 102 through an opening 110 and can be readily contacted in this way. In this case, the elastic band 102 can be composed of two halves, at least one of which contains the hollow space 108, wherein the temperature sensors 104 is arranged in the hollow space 108 before the halves are put together. It is also possible to insert and to position the temperature sensors 104 into the otherwise fully completed elastic band 102 via the opening 110. In the embodiments explained with reference to FIG. 2, the lines 106 can also be provided with a certain degree of mobility in the hollow space 108, so that stretching of the elastic band 102 does not lead to damage to the lines 106.

Figure 3:
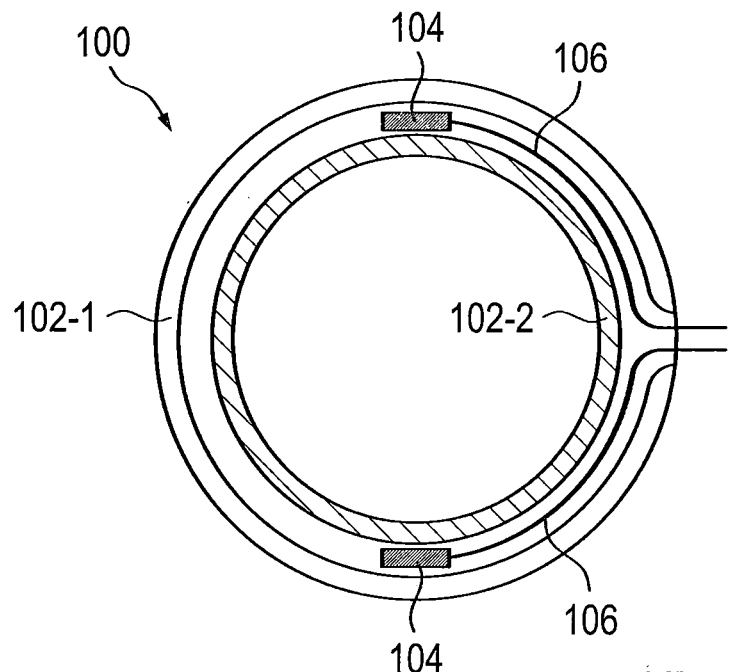
FIG. 3 shows a schematic illustration of a third embodiment of the arrangement according to aspects of the invention for temperature measurement.

FIG. 3 shows a schematic illustration of a third embodiment of the arrangement 100 according to aspects of the invention for temperature measurement. In this embodiment, the elastic band 102 comprises at least one first layer 102-1 and one second layer 102-2. In this case, the first layer 102-1 can provide a required elasticity, while the second layer 102-2 can have a greater thermal conductivity than the first layer 102-1, so that improved thermal coupling to the solid body, on which the arrangement 100 is arranged, is provided. The second layer 102-2 can also have a certain plasticity, which allows improved adaptation in terms of shape to the solid body on which the arrangement 100 is arranged.

Figure 4:
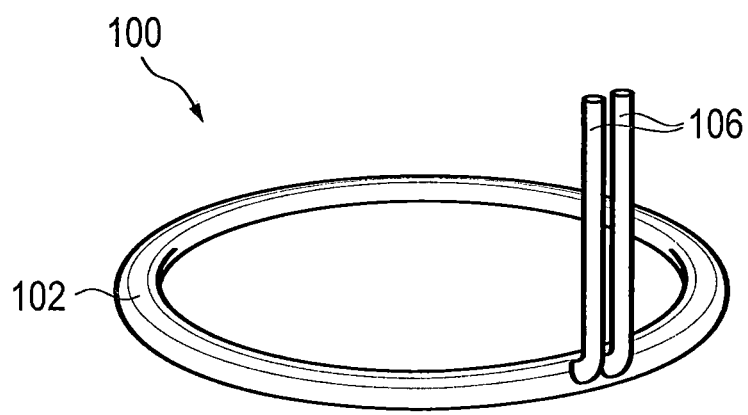
FIG. 4 shows a perspective view of an embodiment of the arrangement according to aspects of the invention for temperature measurement.

FIG. 4 shows a perspective view of an embodiment of the arrangement 100 according to aspects of the invention for temperature measurement. This FIG. clearly shows how the lines 106 are routed out of the elastic ring and allow easy contacting.

Figure 5:
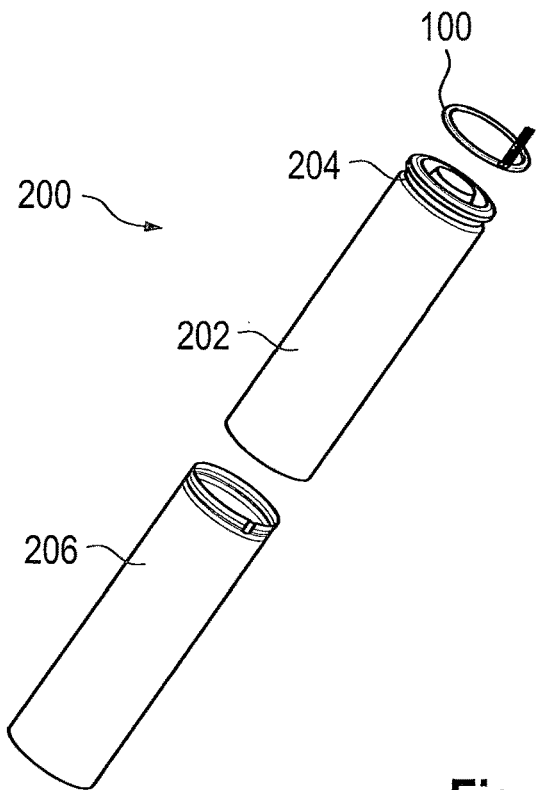
FIG. 5 shows a perspective exploded drawing of a battery cell having an arrangement for temperature measurement.

FIG. 5 shows a perspective exploded drawing of a battery cell 200 having an arrangement 100 according to aspects of the invention for temperature measurement. The battery cell 200 comprises a battery housing 202, a groove 204 being formed at one end of said battery housing. The battery cell 200 comprises safety devices, not specifically designated in the FIG., for example temperature protection means embodied in the form of a PTC thermistor and an overpressure valve, and also two electrodes. One of the electrodes can be formed by the battery housing 202. The arrangement 100 for temperature measurement is already illustrated in the vicinity of the groove 204, in which it is intended to be arranged. A sheathing 206 is illustrated below the battery housing 202. The sheathing 206 can consist, for example, of a material which contracts when heat is supplied and in this way bears against the contours of the battery housing.

Figure 6:
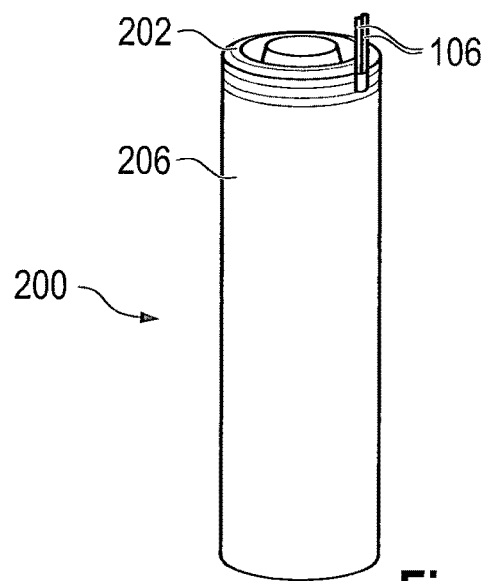
FIG. 6 shows a perspective view of the battery cell in the completely assembled state.

FIG. 6 shows a perspective view of the battery cell 200 from FIG. 5 in the completely assembled state. The components in this illustration is clearly identifiable that the sheathing 206, besides the battery housing 202, also encompasses the arrangement 100 according to aspects of the invention for temperature measurement and securely holds it in the groove 204, so that a change in position of the arrangement 100 for temperature measurement can be virtually precluded. Only the lines 106 exit from the sheathing 206, so that they can be easily contacted.

Figure 7:
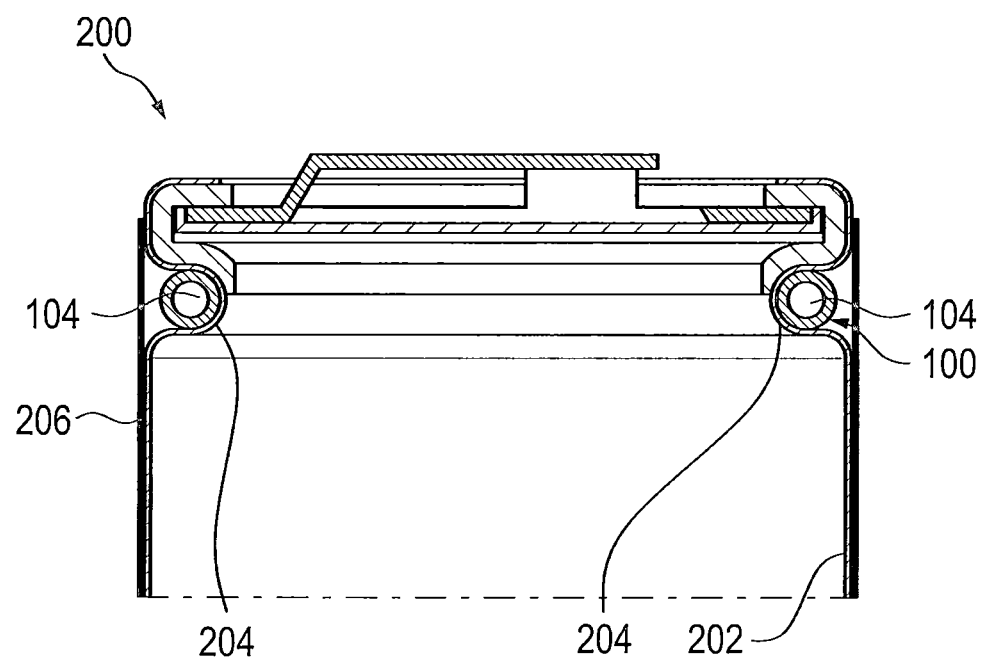
FIG. 7 shows a view of a detail of a section through the battery cell with the arrangement for temperature measurement arranged on it.

FIG. 7 shows a view of a detail of a section through the battery cell 200 with the arrangement 100 according to aspects of the invention for temperature measurement arranged on it. This view clearly shows the position of the arrangement 100 in the groove 204, as well as the position of the temperature sensors 104. Said FIG. likewise shows how the sheathing 206 encompasses the battery housing 202 and the arrangement 100 for temperature measurement. The further elements of the battery cell 200 are of a conventional nature and therefore will not be explained in any detail at this juncture.

Figure 8:
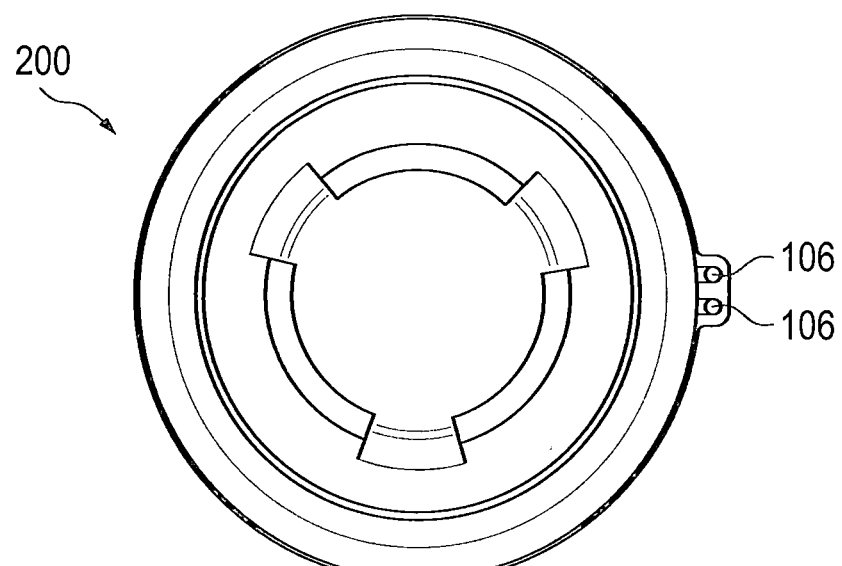
FIG. 8 shows a plan view of the battery cell with the arrangement for temperature measurement arranged on it.

FIG. 8 shows a plan view of the battery cell 200 with the arrangement 100 according to aspects of the invention for temperature measurement arranged on it. This view readily shows that only the lines 206 protrude beyond the dimensions of the battery cell 200. Since the lines 106 are preferably flexible, and also can be embodied to be particularly thin, for example in the form of flat conductors arranged on or in a flexible substrate, they do not cause any major problems during assembly of a plurality of battery cells 200 to form a battery pack.

Figure 9:
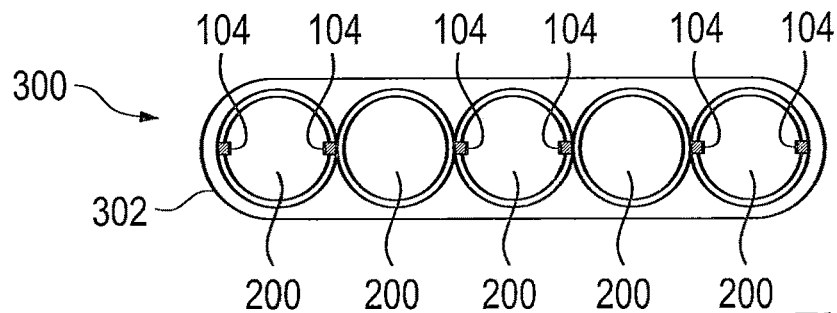
FIG. 9 shows a plan view of an exemplary battery pack with a plurality of battery cells, at least some of which have an arrangement according to aspects of the invention for temperature measurement.

FIG. 9 shows a plan view of an exemplary battery pack 300 with a plurality of battery cells 200, at least some of which have an arrangement 100 according to aspects of the invention for temperature measurement. The battery pack 300 has a housing 320 in which the battery cell 200 are arranged in a row. The position of the temperature sensors 104 is indicated on three of the battery cells 200, specifically the two arranged on the outside and also that arranged in the middle. The two other battery cells can be embodied without an arrangement 100 for temperature measurement, or the temperature sensors can be located in a different position. Since the temperature sensors 104 generally do not measure in a targeted manner, the temperature of the battery cells 200 which are arranged adjacent to battery cells 200 provided with an arrangement 100 for temperature measurement is also detected. The affiliation of the temperature sensors 104 to respective battery cells 200 can be identified on the basis of their arrangement with respect to the contours. A single battery cell 200, the temperature of which is increased, may possibly be determined by the temperature differences from adjacent battery cells.

Figure 10:
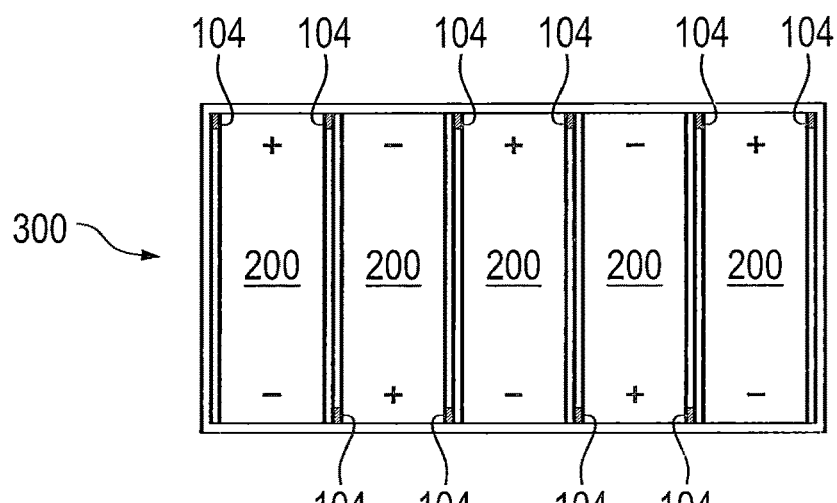
FIG. 10 shows a side view of an exemplary battery pack with a plurality of battery cells with arrangements according to aspects of the invention for temperature measurement.

FIG. 10 shows a side view of an exemplary battery pack 300 with a plurality of battery cells 200 having arrangements 100 for temperature measurement. In the case of this battery pack 300, the battery cells 200 are interconnected in series in order to achieve a desired voltage of the battery pack 300. In the case of battery cells 200, the electrodes of which are arranged at opposite ends, these are generally arranged with respect to one another such that a positive electrode of one battery cell 200 comes to rest next to a negative electrode of an adjacent battery cell 200, so that only short connecting lines are required. If an arrangement 100 for temperature measurement is always provided on the same electrode of each of the battery cells 200 (indicated by the temperature sensors 104 in the FIG.), the temperature can be monitored on two opposite sides of the battery cells 200 of the battery pack 300 in this way.

Figure 11:
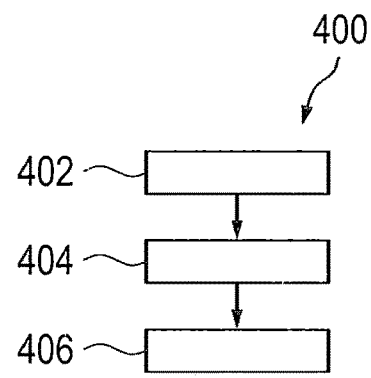
FIG. 11 shows a flowchart of an exemplary method for producing a battery cell having an arrangement according to aspects of the invention for temperature measurement.

FIG. 11 shows a flowchart of an exemplary method 400 for producing a battery cell 200 having an arrangement 100 according to aspects of the invention for temperature measurement. A housing 202 of a battery cell 200, together with all further components and elements of a battery cell 200, a sheathing 206 and also an arrangement 100 for temperature measurement are provided in step 402. In step 404, the arrangement 100 for temperature measurement is fastened to the housing 202 of the battery cell 200. Finally, in step 406, the housing 202 of the battery cell 200 and also the arrangement 100 for temperature measurement arranged on it are surrounded or sheathed by a sheathing 206.

LIST OF REFERENCE SIGNS

100 Arrangement
102 Elastic band
102-1 First layer
102-2 Second layer
104 Temperature sensor
106 Line
108 Hollow space
110 Opening
200 Battery cell
202 Battery housing
204 Groove
206 Sheathing
300 Battery pack
302 Housing
400 Method
402 Providing
404 Surrounding/sheathing

What is claimed is:

1. A battery cell assembly for a motor vehicle, said battery cell assembly comprising:
   a battery cell;
   an arrangement for measuring a temperature of the battery cell, said arrangement comprising:
   (a) an annularly closed elastic band that is sized, shaped and configured to be placed about a perimeter of the battery cell; and
   (b) at least two temperature sensors arranged (i) at a distance from one another, (ii) either along a circumference of the annularly closed elastic band or within an interior of the annularly closed elastic band, and (iii) to face an exterior surface of the battery cell for measuring the temperature of the battery cell,
   wherein the battery cell includes a revolved exterior surface having a groove formed about the revolved exterior surface, and wherein the arrangement is positioned within the groove, and
   wherein a cross-sectional diameter of the band corresponds with a cross-sectional diameter of the groove in an assembled state.

2. The battery cell assembly as claimed in claim 1, wherein the annularly closed elastic band is composed of an electrically non-conductive, thermally conductive and/or heat-resistant material.

3. The battery cell assembly as claimed in claim 1, wherein a surface of each of the at least two temperature sensors terminates substantially flush with an internal surface of the annularly closed elastic band or is at least positioned closer to the internal surface of the annularly closed elastic band than to an external surface of the annularly closed elastic band.

4. The battery cell assembly as claimed in claim 1, wherein the elastic band has a first elastic layer and a second layer that is arranged at least on a side of the first elastic layer that faces the battery cell in an assembled state, the second layer having a greater thermal conductivity than the first elastic layer, and wherein a surface of each of the at least two temperature sensors is in contact with the second layer.

5. The battery cell assembly as claimed in claim 1, wherein electrical lines of the at least two temperature sensors are routed to an outer side of the annularly closed elastic band and are routed out or are electrically contactable there.

6. The battery cell assembly as claimed in claim 1, wherein the at least two temperature sensors are distributed uniformly along the circumference of the annularly closed elastic band.

7. The battery cell assembly as claimed in claim 1, wherein the arrangement for temperature measurement bears against an outer side of the battery cell under elastic stress.

8. The battery cell assembly as claimed in claim 1, wherein the battery cell is surrounded by an electrically non-conductive sheath which presses the arrangement for temperature measurement against the battery cell.

9. A battery pack comprising more than one battery cell assembly of claim 1.

10. The battery pack as claimed in claim 9, wherein battery cells with an arrangement for temperature measurement and battery cells without such an arrangement for temperature measurement are arranged with respect to one another such that a battery cell equipped with the arrangement makes contact with an adjacent battery cell without such an arrangement in a region of one of the temperature sensors.

11. A method for producing a battery cell assembly comprising a battery cell and a temperature measurement device, said method comprising the steps of:
   attaching the temperature measurement device to the battery cell, wherein the battery cell includes a revolved exterior surface having a groove formed about the revolved exterior surface, wherein the temperature measurement device includes (a) an annularly closed elastic band that is sized, shaped and configured to be placed within the groove, and (b) at least two temperature sensors arranged (i) at a distance from one another, (ii) either along a circumference of the annularly closed elastic band or within an interior of the annularly closed elastic band, and (iii) to face an exterior surface of the battery cell for measuring the temperature of the battery cell, wherein the attaching step comprises positioning the temperature measurement device within the groove such that a cross-sectional diameter of the band corresponds with a cross-sectional diameter of the groove in an assembled state; and surrounding the battery cell and the temperature measurement device with an elastically non-conductive sheath.

12. The battery cell assembly as claimed in claim 1, wherein the elastic band is monolithic.

13. The battery cell assembly as claimed in claim 1, wherein the elastic band is tubular in cross-section.

14. The battery cell assembly as claimed in claim 1, wherein a circumference of the elastic band is smaller than a largest circumference of the battery cell.

15. The battery cell assembly as claimed in claim 1, wherein the battery cell includes a positive terminal and a negative terminal, wherein the elastic band is positioned closer to the positive terminal than the negative terminal.

16. The battery cell assembly as claimed in claim 1, wherein the battery cell assembly is configured to supply power to a drive motor of the vehicle.

\* \* \* \* \*